J. SEADLER.
RESILIENT WHEEL.
APPLICATION FILED OCT. 14, 1912.

1,051,276.

Patented Jan. 21, 1913.

2 SHEETS—SHEET 1.

WITNESSES:

INVENTOR
James Seadler
BY G. H. Strong
ATTORNEY

J. SEADLER.
RESILIENT WHEEL.
APPLICATION FILED OCT. 14, 1912.

1,051,276.

Patented Jan. 21, 1913.

2 SHEETS—SHEET 2.

WITNESSES:

INVENTOR.
James Seadler
BY G. H. Strong
his ATTORNEY.

UNITED STATES PATENT OFFICE.

JAMES SEADLER, OF SACRAMENTO, CALIFORNIA.

RESILIENT WHEEL.

1,051,276.  Specification of Letters Patent. Patented Jan. 21, 1913.

Application filed October 14, 1912. Serial No. 725,632.

*To all whom it may concern:*

Be it known that I, JAMES SEADLER, a citizen of the United States, residing at Sacramento, in the county of Sacramento and State of California, have invented new and useful Improvements in Resilient Wheels, of which the following is a specification.

This invention relates to vehicle wheels, and pertains especially to a resilient wheel for use in automobiles and vehicles generally.

The object of the present invention is to provide a wheel which will be simple, practical and durable, and which will provide, by a novel system of springs, the desired degree of resiliency ordinarily possessed by pneumatic tired wheels.

Another object of the invention is to provide means for temporarily holding the springs out of contact with the outer rim when it is desired to remove the rim when making repairs, or for other purposes.

A further object is generally to improve this class of wheels so as to increase their utility, durability and efficiency.

It comprises certain novel constructions, combinations and arrangements of parts, all of which will be hereinafter more particularly set forth and described in the following specifications and drawings, in which—

Figure 1:
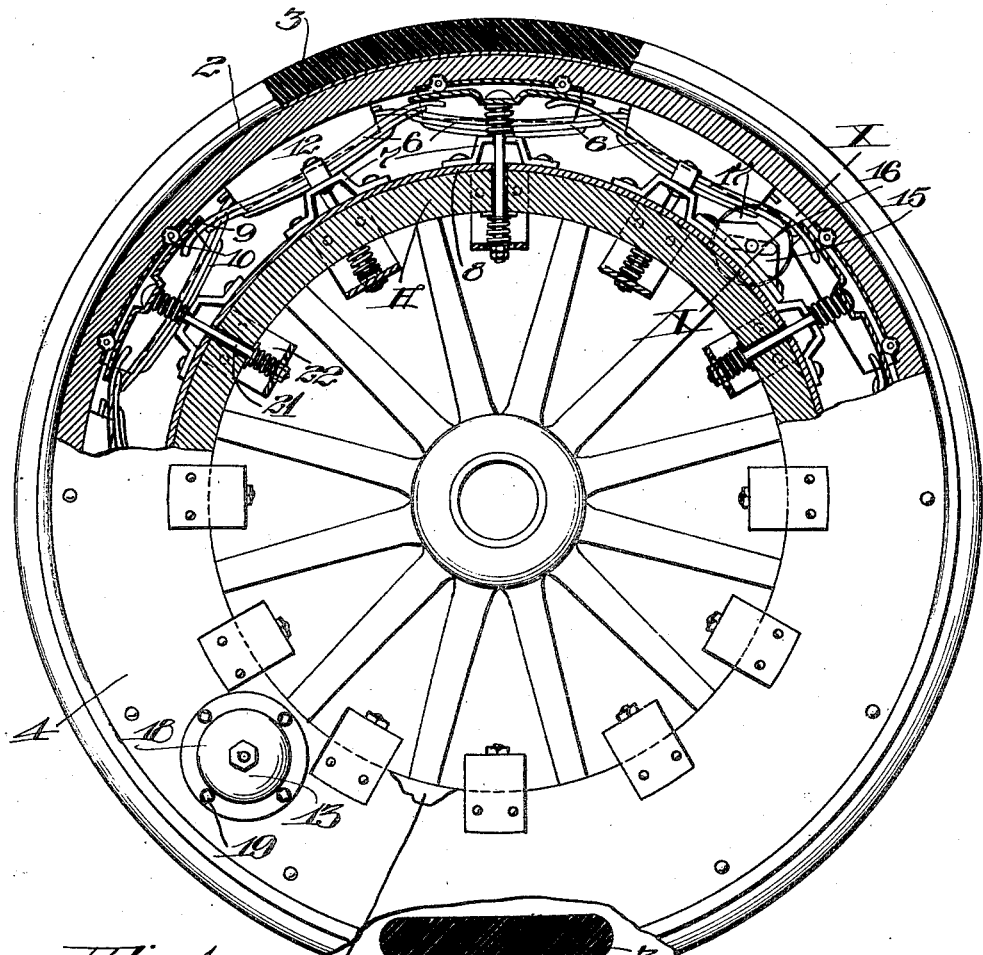
Figure 2:
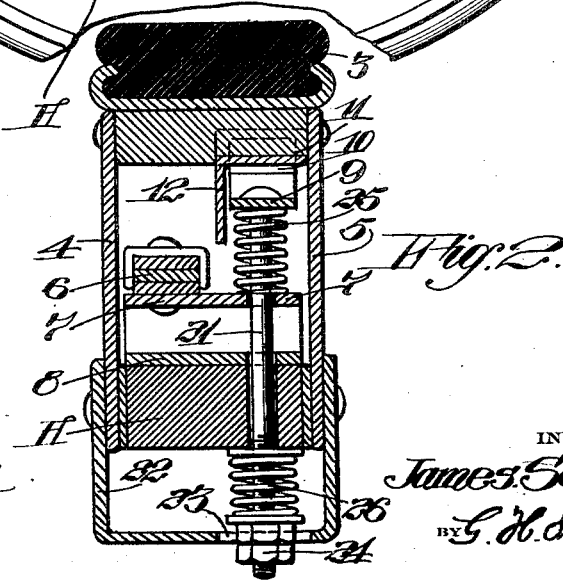
Figure 5:
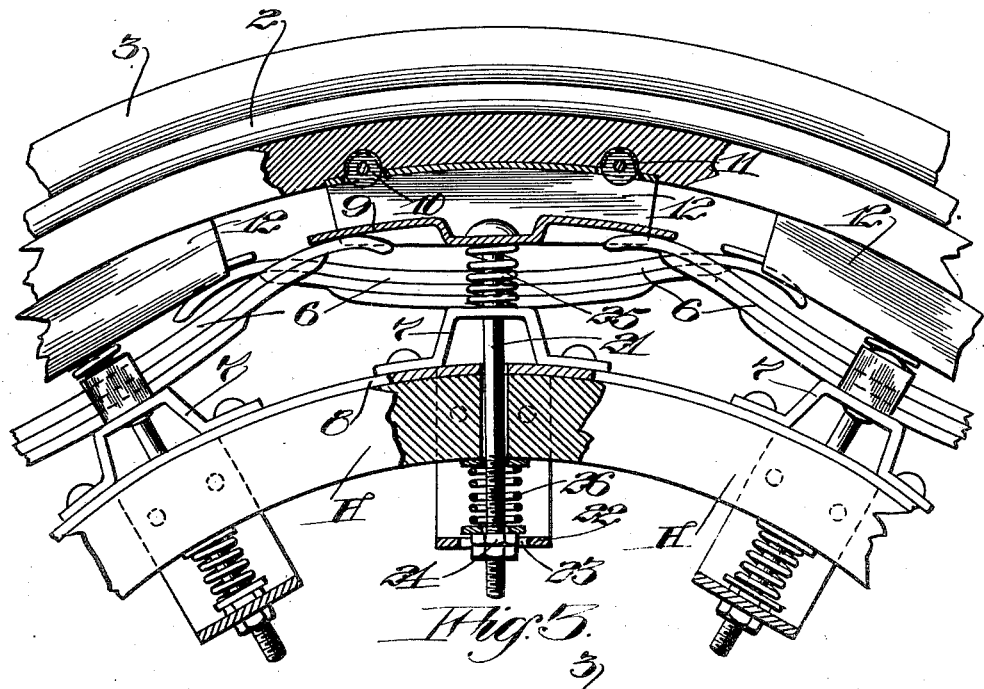
Figure 4:
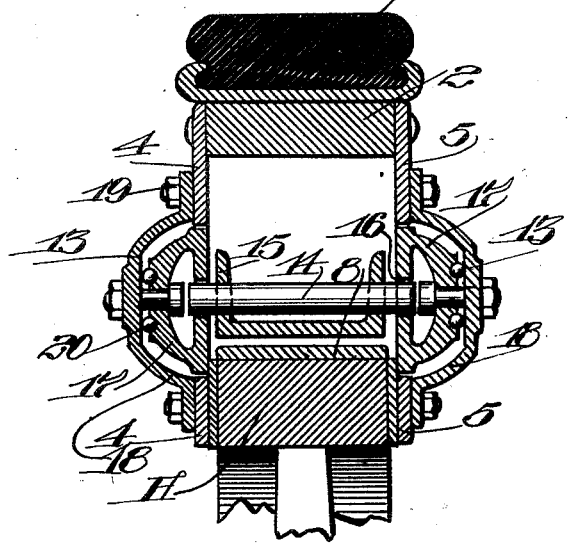

Figure 1 is a side elevation of the wheel partly broken away. Fig. 2 is a cross section of same. Fig. 3 is an enlarged detail view of same in side elevation. Fig. 4 is a section on line X—X, Fig. 1.

By referring to the drawings, A indicates the wheel felly or inner rim portion of my improved wheel and 2 the outer rim or tread portion. The two rims are suitably spaced apart and yieldably connected in a manner shortly to be described. The outer rim 2 is of metal and is preferably provided with a suitable resilient tread portion 3, of rubber or like material. For the purpose of housing the mechanism interposed between the two rims A and 2, I provide two annular side rings or flanges 4 and 5 which may be secured to the sides of the outer rim as shown.

Between the rims, at suitably spaced intervals around the circumference of the wheel, is provided a series of semi-elliptical springs 6 which are each fixed to blocks 7; the blocks 7 being suitably secured to the outer periphery of a ring or band 8, suitably secured to the main wheel or felly A. The outer ends of the springs 6 are adapted to bear slidably on plates 9, which in turn are slidably mounted on rollers 10. These rollers 10 are suitably journaled in shoes 11, secured to the outer rim, and which shoes are provided with side flanges 12 for the purpose of preventing any side movement or displacement of the plates 9. The springs 6 are mounted alternately on each side of the center of the wheel, as shown, for the purpose of providing the greatest spring contact area possible and to equalize the spring pressure as much as possible.

With the object in view of providing a positive connection between the inner and outer rims, which will allow the transmission of tractive force, and which will allow a limited amount of circumferential movement of the outer rim with respect to the inner rim, and to allow the two rims to accommodate themselves to the varying degrees of eccentricity incident to the yielding movement of one rim with relation to the other, when the wheel is traveling along the street or roadway, I have provided a means, generally indicated at 13, which consists of a bolt or pin 14 mounted in a bracket 15 secured to the inner rim, or otherwise secured as by driving it directly through the rim. The outer ends of the pin 14 project into slots 16 formed in circular, turnable bearings 17, mounted in the outside annular flanges 4 and 5 through the medium of cup-shaped members 18. The members 18 are secured to the flanges by the screws and nuts 19; suitable ball bearings, as 20, being interposed between the turnable bearings 17 and the members 18 to secure the freest movement possible. The plates being turnably mounted in the outside flanges and provided with slots 16, with which the outer ends of the pins engage, will allow the necessary amount of circumferential movement and also varying degrees of eccentricity of the rims with relation to each other; these different movements being possible by the free movement of the pin 14 in the slots which is only limited by the length of the slots. From this it can be seen that a positive connection between the two rims is provided which allows the desired play or movement between the inner and outer rims. The slots allow circumferential movement between the rims, while the turning movement of the plates will allow the rims to come together or pull apart.

For the purpose of holding the springs, when it is desired to either replace or remove the outer rim 2, I have provided a bolt 21 which is secured to the plate 9. The bolt passes through the block 7, the inner rim A, and a yoke 22 which is provided with a central opening 23 through which the bolt extends.

When it is desired to remove the outer rim, it is only necessary to bring the bearing plate 9 out of contact with the inner periphery of the outer rim which will relieve the outer rim of the spring tension of the bearing springs. This is accomplished by introducing a socket wrench or equivalent means through the socket portion 23 of the yoke to engage the nuts 24 on the bolt. By tightening up on the nuts through the action of the wrench, it is possible to withdraw the plate 9 and bearings from contact with the outer rim and thus leave this free to be removed. Suitable coil springs, as 25 and 26, are interposed between the plate and lock and the inner rim and nuts to hold the retracting bolt and prevent undue play of this when the bearing plate 9 is in the normal contact position.

When it is desired to remove a broken or lame spring, it is only necessary to unscrew the bolt 20 to its farthest extent. This will allow the spring to expand to its fullest extent when it may be easily removed.

In operation, with the wheel resting on the ground and supporting its load, it can be seen that the load will be carried by several of the springs which are nearest to the ground and that the springs which are at the top of the wheel will consequently expand in proportion to the compression attained by the lower springs and thus equalize the load. The moment tractive force is transmitted to the wheel a yielding movement of the outer rim, with relation to the inner rim, is permitted to the extent of the movement of the pin 14 within the slots 15. This movement is transmitted or taken up by the bearing plates 9; sliding movement of the bearing springs only taking place during compression or expansion of same.

The wheel is simple, compact and reliable in its actions and is so constructed that it may be applied to the felly of any standard wheel. The materials and finish of the several parts of the wheel are such as experience and judgment of the manufacturer may dictate.

It is manifest that the construction herein shown may be varied without departing from the principle of the invention, and I desire it to be understood that various changes in form and construction may be resorted to within the scope of the appended claims.

Having thus described my invention, what I claim and desire to secure by Letters Patent is—

1. A resilient wheel comprising an inner and outer rim, a plurality of semi-elliptical bearing springs interposed between the inner and outer rims, blocks mounted on the outer periphery of the inner rim to which said springs are secured, a plurality of guide shoes secured to the inner periphery of the outer rim, rollers mounted in said shoes, plates mounted on said rollers so positioned as to be interposed between the ends of the bearing springs and the rollers, means for retracting the spring bearing plates from contact with the rollers, and means connecting the inner and outer rims through which tractive force may be transmitted from one rim to the other.

2. A resilient wheel comprising an inner and outer rim, a plurality of semi-elliptical bearing springs interposed between the inner and outer rims, blocks mounted on the outer periphery of the inner rim to which said springs are secured, a plurality of guide shoes secured to the inner periphery of the outer rim, rollers mounted in said shoes, plates mounted on said rollers so positioned as to be interposed between the ends of the bearing springs and the rollers, means for retracting the spring bearing plates from contact with the rollers, said means comprising bolts secured to the plates, said bolts extending through guideways in the inner rim and being threaded at their inner ends, nuts on said bolts by which the bolts may be retracted to bring the plates out of contact with the rollers, side plates secured to the outer rim, yokes or straps connecting said plates, and means connecting the inner and outer rims through which tractive force may be transmitted from one rim to the other.

3. A resilient wheel comprising an inner and outer rim, a plurality of semi-elliptical bearing springs interposed between the inner and outer rims, blocks mounted on the outer periphery of the inner rim to which said springs are secured, a plurality of guide shoes secured to the inner periphery of the outer rim, rollers mounted in said shoes, plates mounted on said rollers, so positioned as to be interposed between the ends of the bearing springs and the rollers, means for retracting the spring bearing plates from contact with the rollers, said means comprising bolts secured to the plates, said bolts extending through guideways in the inner rim and being threaded at their inner ends, nuts on said bolts by which the bolts may be retracted to bring the plates out of contact with the rollers, side plates secured to the outer rim, yokes or straps connecting said plates, means connecting the inner and outer rims through which tractive force may be transmitted from one rim to the other, said means comprising turnable slotted bearings secured to the side plates, and pins secured to the inner rim so positioned as to have their ends engage with the slots in the turnable bearings to form a connection between the inner and outer rims.

In testimony whereof I have hereunto set my hand in the presence of two subscribing witnesses.

JAMES SEADLER.

Witnesses:
F. J. GARDON,
L. J. MILLER.